(12) United States Patent
Jeddeloh

(10) Patent No.: US 7,149,874 B2
(45) Date of Patent: Dec. 12, 2006

(54) MEMORY HUB BYPASS CIRCUIT AND METHOD

(75) Inventor: Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 189 days.

(21) Appl. No.: 10/222,415

(22) Filed: Aug. 16, 2002

(65) Prior Publication Data

US 2004/0034753 A1 Feb. 19, 2004

(51) Int. Cl.
*G06F 12/00* (2006.01)

(52) U.S. Cl. .................. 711/220; 711/105; 711/202; 711/154; 711/211; 711/5; 365/185.11; 365/230.03; 365/230.06; 365/230.08

(58) Field of Classification Search ............ 711/5, 711/105, 154, 156, 167, 168, 169; 365/185.11, 365/230.02, 230.03, 230.05, 230.06, 230.08
See application file for complete search history.

(56) References Cited

U.S. PATENT DOCUMENTS

| | | | | |
|---|---|---|---|---|
| 3,742,253 A | | 6/1973 | Kronies .................. | 327/217 |
| 4,045,781 A | * | 8/1977 | Levy et al. .............. | 711/162 |
| 4,240,143 A | | 12/1980 | Besemer et al. ........ | 364/200 |
| 4,245,306 A | | 1/1981 | Besemer et al. ........ | 364/200 |
| 4,253,144 A | | 2/1981 | Bellamy et al. ........ | 364/200 |
| 4,253,146 A | | 2/1981 | Bellamy et al. ........ | 364/200 |
| 4,608,702 A | | 8/1986 | Hirzel et al. ........... | 375/110 |

(Continued)

FOREIGN PATENT DOCUMENTS

| | | |
|---|---|---|
| EP | 0 849 685 A2 | 6/1998 |
| JP | 2001265539 A | 9/2001 |
| WO | WO 93/19422 | 9/1993 |
| WO | WO 98/57489 | 12/1998 |
| WO | WO 02/27499 A2 | 4/2002 |

OTHER PUBLICATIONS

"Free On–Line Dictionary of Computing" entry Flash Erasable Programmable Read–Only Memory, online May 17, 2004 [http://wombat.doc.ic.ac.uk/foldoc/foldoc.cgi?flash+memory].
Intel, "Intel 840 Chipset: 82840 Memory Controller Hub (MCH)", Datasheet, Oct. 1999, pp. 1–178.
Intel, "Flash Memory PCI Add–In Card for Embedded Systems", Application Note Ap–758, Sep., 1997, pp. i–13.
Shanley, T. et al., "PCI System Architecture", Third Edition, Mindshare, Inc., 1995, pp. 24–25.
Rambus, Inc., "Direct Rambus Technology Disclosure", Oct. 1997, pp. 1–16.

*Primary Examiner*—Brian R. Peugh
(74) *Attorney, Agent, or Firm*—Dorsey & Whitney, LLP

(57) ABSTRACT

A computer system and a method used to access data from a plurality of memory devices with a memory hub. The computer system includes a plurality of memory modules coupled to a memory hub controller. Each of the memory modules includes the memory hub and the plurality of memory devices. The memory hub includes a sequencer and a bypass circuit. When the memory hub is busy servicing one or more memory requests, the sequencer generates and couples the memory requests to the memory devices. When the memory hub is not busy servicing multiple memory requests, the bypass circuit generates and couples a portion of each of the memory requests to the memory devices and the sequencer generates and couples the remaining portion of each of the memory requests to the memory devices.

40 Claims, 2 Drawing Sheets

U.S. PATENT DOCUMENTS

| | | | |
|---|---|---|---|
| 4,707,823 A | 11/1987 | Holdren et al. | 370/1 |
| 4,724,520 A | 2/1988 | Athanas et al. | 364/200 |
| 4,831,520 A | 5/1989 | Rubinfeld et al. | 710/305 |
| 4,891,808 A | 1/1990 | Williams | 370/112 |
| 4,930,128 A | 5/1990 | Suzuki et al. | 371/12 |
| 4,953,930 A | 9/1990 | Ramsey et al. | 385/14 |
| 5,241,506 A | 8/1993 | Motegi et al. | 365/210 |
| 5,243,703 A | 9/1993 | Farmwald et al. | 395/325 |
| 5,251,303 A | 10/1993 | Fogg, Jr. et al. | 710/24 |
| 5,269,022 A | 12/1993 | Shinjo et al. | 395/700 |
| 5,313,590 A | 5/1994 | Taylor | 710/317 |
| 5,317,752 A | 5/1994 | Jewett et al. | 395/750 |
| 5,319,755 A | 6/1994 | Farmwald et al. | 395/325 |
| 5,327,553 A | 7/1994 | Jewett et al. | 714/3 |
| 5,355,391 A | 10/1994 | Horowitz et al. | 375/36 |
| 5,432,823 A | 7/1995 | Gasbarro et al. | 375/356 |
| 5,432,907 A | 7/1995 | Picazo, Jr. et al. | 709/249 |
| 5,442,770 A | 8/1995 | Barratt | 711/3 |
| 5,461,627 A | 10/1995 | Rypinski | 370/95.2 |
| 5,465,229 A | 11/1995 | Bechtolsheim et al. | 345/477 |
| 5,479,370 A * | 12/1995 | Furuyama et al. | 365/189.12 |
| 5,497,476 A | 3/1996 | Oldfield et al. | 711/112 |
| 5,502,621 A | 3/1996 | Schumacher et al. | 361/760 |
| 5,544,319 A | 8/1996 | Acton et al. | 709/246 |
| 5,566,325 A | 10/1996 | Bruce, II et al. | 395/494 |
| 5,577,220 A | 11/1996 | Combs et al. | 395/416 |
| 5,581,767 A | 12/1996 | Katsuki et al. | 395/800 |
| 5,606,717 A | 2/1997 | Farmwald et al. | 395/856 |
| 5,638,334 A | 6/1997 | Farmwald et al. | 365/230.03 |
| 5,659,798 A | 8/1997 | Blumrich et al. | 710/26 |
| 5,687,325 A | 11/1997 | Chang | 710/104 |
| 5,706,224 A | 1/1998 | Srinivasan et al. | 365/49 |
| 5,710,733 A | 1/1998 | Chengson et al. | 365/52 |
| 5,715,456 A | 2/1998 | Bennett et al. | 395/652 |
| 5,729,709 A * | 3/1998 | Harness | 711/5 |
| 5,748,616 A | 5/1998 | Riley | 370/242 |
| 5,796,413 A | 8/1998 | Shipp et al. | 345/522 |
| 5,818,844 A | 10/1998 | Singh et al. | 370/463 |
| 5,819,304 A | 10/1998 | Nilsen et al. | 711/5 |
| 5,822,255 A | 10/1998 | Uchida | 365/194 |
| 5,832,250 A | 11/1998 | Whittaker | 395/471 |
| 5,875,352 A | 2/1999 | Gentry et al. | 710/23 |
| 5,875,454 A | 2/1999 | Craft et al. | 711/113 |
| 5,887,159 A | 3/1999 | Burrows | 395/567 |
| 5,889,714 A | 3/1999 | Schumann et al. | 365/203 |
| 5,928,343 A | 7/1999 | Farmwald et al. | 710/104 |
| 5,963,942 A | 10/1999 | Igata | 707/6 |
| 5,966,724 A | 10/1999 | Ryan | 711/105 |
| 5,973,935 A | 10/1999 | Schoenfeld et al. | 361/813 |
| 5,973,951 A | 10/1999 | Bechtolsheim et al. | 365/52 |
| 5,978,567 A | 11/1999 | Rebane et al. | 395/200.49 |
| 5,987,196 A | 11/1999 | Noble | 385/14 |
| 6,011,741 A | 1/2000 | Wallace et al. | 365/221 |
| 6,023,726 A | 2/2000 | Saksena | 709/219 |
| 6,029,250 A | 2/2000 | Keeth | 713/400 |
| 6,031,241 A | 2/2000 | Silfvast et al. | 250/504 R |
| 6,033,951 A | 3/2000 | Chao | 438/253 |
| 6,038,630 A | 3/2000 | Foster et al. | 710/317 |
| 6,061,263 A | 5/2000 | Boaz et al. | 365/51 |
| 6,061,296 A | 5/2000 | Ternullo, Jr. et al. | 365/233 |
| 6,067,262 A | 5/2000 | Irrinki et al. | 365/201 |
| 6,067,649 A | 5/2000 | Goodwin | 714/718 |
| 6,073,190 A | 6/2000 | Rooney | 710/56 |
| 6,076,139 A | 6/2000 | Welker et al. | 711/104 |
| 6,079,008 A | 6/2000 | Clery, III | 712/11 |
| 6,092,158 A | 7/2000 | Harriman et al. | 711/151 |
| 6,098,158 A | 8/2000 | Lay et al. | 711/162 |
| 6,105,075 A | 8/2000 | Ghaffari | 710/5 |
| 6,111,757 A | 8/2000 | Dell et al. | 361/737 |
| 6,125,431 A | 9/2000 | Kobayashi | 711/154 |
| 6,128,703 A | 10/2000 | Bourekas et al. | 711/138 |
| 6,131,149 A | 10/2000 | Lu et al. | 711/167 |
| 6,134,024 A | 10/2000 | Miura et al. | 710/131 |
| 6,134,624 A | 10/2000 | Burns et al. | 710/131 |
| 6,137,709 A | 10/2000 | Boaz et al. | 365/51 |
| 6,144,587 A | 11/2000 | Yoshida | 365/189.05 |
| 6,167,465 A | 12/2000 | Parvin et al. | 710/22 |
| 6,167,486 A | 12/2000 | Lee et al. | 711/120 |
| 6,175,571 B1 | 1/2001 | Haddock et al. | 370/423 |
| 6,185,352 B1 | 2/2001 | Hurley | 385/114 |
| 6,185,676 B1 | 2/2001 | Poplingher et al. | 712/239 |
| 6,186,400 B1 | 2/2001 | Dvorkis et al. | 235/462.45 |
| 6,191,663 B1 | 2/2001 | Hannah | 333/17.3 |
| 6,201,724 B1 | 3/2001 | Ishizaki et al. | 365/49 |
| 6,208,180 B1 | 3/2001 | Fisch et al. | 327/141 |
| 6,219,725 B1 | 4/2001 | Diehl et al. | 710/26 |
| 6,223,301 B1 | 4/2001 | Santeler et al. | 714/6 |
| 6,233,376 B1 | 5/2001 | Updegrove | 385/14 |
| 6,243,769 B1 | 6/2001 | Rooney | 710/56 |
| 6,243,831 B1 | 6/2001 | Mustafa et al. | 714/24 |
| 6,246,618 B1 | 6/2001 | Yamamoto et al. | 365/200 |
| 6,247,107 B1 | 6/2001 | Christie | 711/216 |
| 6,249,802 B1 | 6/2001 | Richardson et al. | 709/200 |
| 6,256,692 B1 | 7/2001 | Yoda et al. | 710/104 |
| 6,266,730 B1 | 7/2001 | Perino et al. | 710/300 |
| 6,272,609 B1 | 8/2001 | Jeddeloh | 711/169 |
| 6,285,349 B1 | 9/2001 | Smith | 345/690 |
| 6,286,083 B1 | 9/2001 | Chin et al. | 711/151 |
| 6,294,937 B1 | 9/2001 | Crafts et al. | 327/158 |
| 6,301,637 B1 | 10/2001 | Krull et al. | 711/112 |
| 6,324,485 B1 | 11/2001 | Ellis | 702/117 |
| 6,327,642 B1 | 12/2001 | Lee et al. | 711/120 |
| 6,330,205 B1 | 12/2001 | Shimizu et al. | 365/230.06 |
| 6,347,055 B1 | 2/2002 | Motomura | 365/189.05 |
| 6,349,363 B1 | 2/2002 | Cai et al. | 711/129 |
| 6,356,573 B1 | 3/2002 | Jonsson et al. | 372/46 |
| 6,367,074 B1 | 4/2002 | Bates et al. | 711/170 |
| 6,370,068 B1 | 4/2002 | Rhee | 365/196 |
| 6,370,611 B1 | 4/2002 | Callison et al. | 711/105 |
| 6,373,777 B1 | 4/2002 | Suzuki | 365/230.03 |
| 6,381,190 B1 | 4/2002 | Shinkai | 365/230.03 |
| 6,389,514 B1 | 5/2002 | Rokicki | 711/136 |
| 6,392,653 B1 | 5/2002 | Malandain et al. | 345/501 |
| 6,401,149 B1 | 6/2002 | Dennin et al. | 710/58 |
| 6,401,213 B1 | 6/2002 | Jeddeloh | 713/401 |
| 6,405,280 B1 | 6/2002 | Ryan | 711/105 |
| 6,421,744 B1 | 7/2002 | Morrison et al. | 710/22 |
| 6,430,696 B1 | 8/2002 | Keeth | 713/503 |
| 6,434,639 B1 | 8/2002 | Haghighi | 710/39 |
| 6,434,696 B1 | 8/2002 | Kang | 713/2 |
| 6,434,736 B1 | 8/2002 | Schaecher et al. | 716/17 |
| 6,438,622 B1 | 8/2002 | Haghighi et al. | 710/1 |
| 6,438,668 B1 | 8/2002 | Esfahani et al. | 711/165 |
| 6,449,308 B1 | 9/2002 | Knight, Jr. et al. | 375/212 |
| 6,453,393 B1 | 9/2002 | Holman et al. | 711/154 |
| 6,457,116 B1 | 9/2002 | Mirsky et al. | 712/16 |
| 6,460,114 B1 | 10/2002 | Jeddeloh | 711/120 |
| 6,462,978 B1 | 10/2002 | Shibata et al. | 365/63 |
| 6,463,059 B1 | 10/2002 | Movshovich et al. | 370/389 |
| 6,470,422 B1 | 10/2002 | Cai et al. | 711/129 |
| 6,473,828 B1 | 10/2002 | Matsui | 711/104 |
| 6,477,592 B1 | 11/2002 | Chen et al. | 710/52 |
| 6,477,614 B1 | 11/2002 | Leddige et al. | 711/5 |
| 6,477,621 B1 | 11/2002 | Lee et al. | 711/120 |
| 6,479,322 B1 | 11/2002 | Kawata et al. | 438/109 |
| 6,487,556 B1 | 11/2002 | Downs et al. | 707/101 |
| 6,490,188 B1 | 12/2002 | Nuxoll et al. | 365/63 |
| 6,493,803 B1 | 12/2002 | Pham et al. | 711/147 |
| 6,496,193 B1 | 12/2002 | Surti et al. | 345/552 |
| 6,496,909 B1 | 12/2002 | Schimmel | 711/163 |
| 6,501,471 B1 | 12/2002 | Venkataraman et al. | 345/424 |

| | | | | | | | |
|---|---|---|---|---|---|---|---|
| 6,505,287 B1 | 1/2003 | Uematsu | 711/170 | 6,795,899 B1 | 9/2004 | Dodd et al. | 711/137 |
| 6,523,092 B1 | 2/2003 | Fanning | 711/134 | 6,799,246 B1 | 9/2004 | Wise et al. | 711/117 |
| 6,523,093 B1 | 2/2003 | Bogin et al. | 711/137 | 6,799,268 B1 | 9/2004 | Boggs et al. | 712/228 |
| 6,526,483 B1 | 2/2003 | Cho et al. | 711/154 | 6,804,760 B1 | 10/2004 | Wiliams | 711/170 |
| 6,526,498 B1 | 2/2003 | Mirsky et al. | 712/11 | 6,804,764 B1 | 10/2004 | LaBerge et al. | 711/170 |
| 6,539,490 B1 | 3/2003 | Forbes et al. | 713/401 | 6,807,630 B1 | 10/2004 | Lay et al. | 713/2 |
| 6,552,564 B1 | 4/2003 | Forbes et al. | 326/30 | 6,811,320 B1 | 11/2004 | Abbott | 385/58 |
| 6,553,479 B1 | 4/2003 | Mirsky et al. | 712/16 | 6,816,947 B1 | 11/2004 | Huffman | 711/151 |
| 6,564,329 B1 | 5/2003 | Cheung et al. | 713/322 | 6,820,181 B1 | 11/2004 | Jeddeloh et al. | 711/169 |
| 6,587,912 B1 | 7/2003 | Leddige et al. | 711/5 | 6,821,029 B1 | 11/2004 | Grung et al. | 385/92 |
| 6,590,816 B1 | 7/2003 | Perner | 365/200 | 6,823,023 B1 | 11/2004 | Hannah | 375/296 |
| 6,594,713 B1 | 7/2003 | Fuoco et al. | 710/31 | 6,845,409 B1 | 1/2005 | Talagala et al. | 710/20 |
| 6,594,722 B1 | 7/2003 | Willke, II et al. | 710/313 | 6,889,304 B1 | 5/2005 | Perego et al. | 711/170 |
| 6,598,154 B1 | 7/2003 | Vaid et al. | 712/237 | 6,901,494 B1 | 5/2005 | Zumkehr et al. | 711/167 |
| 6,615,325 B1 | 9/2003 | Mailloux et al. | 711/154 | 6,904,556 B1 | 6/2005 | Walton et al. | 714/766 |
| 6,622,227 B1 | 9/2003 | Zumkehr et al. | 711/167 | 6,910,109 B1 | 6/2005 | Holman et al. | 711/156 |
| 6,628,294 B1 | 9/2003 | Sadowsky et al. | 345/568 | 6,912,612 B1 | 6/2005 | Kapur et al. | 710/309 |
| 6,629,220 B1 | 9/2003 | Dyer | 711/158 | 6,947,672 B1 | 9/2005 | Jiang et al. | 398/135 |
| 6,631,440 B1 | 10/2003 | Jenne et al. | 711/105 | 2001/0039612 A1 | 11/2001 | Lee | 713/2 |
| 6,636,110 B1 | 10/2003 | Ooishi et al. | 327/565 | 2002/0112119 A1 | 8/2002 | Halbert et al. | 711/115 |
| 6,636,912 B1 | 10/2003 | Ajanovic et al. | 710/105 | 2002/0116588 A1 | 8/2002 | Beckert et al. | 711/161 |
| 6,646,929 B1 | 11/2003 | Moss et al. | 365/194 | 2002/0144064 A1 | 10/2002 | Fanning | 711/144 |
| 6,647,470 B1 | 11/2003 | Janzen | 711/154 | 2002/0178319 A1 | 11/2002 | Sanchez-Olea | 710/305 |
| 6,658,509 B1 | 12/2003 | Bonella et al. | 710/100 | 2003/0005223 A1 | 1/2003 | Coulson et al. | 711/118 |
| 6,662,304 B1 | 12/2003 | Keeth et al. | 713/400 | 2003/0005344 A1 | 1/2003 | Bhamidipati et al. | 713/400 |
| 6,665,202 B1 | 12/2003 | Lindahl et al. | 365/49 | 2003/0043158 A1 | 3/2003 | Wasserman et al. | 345/545 |
| 6,667,895 B1 | 12/2003 | Jang et al. | 365/63 | 2003/0043426 A1 | 3/2003 | Baker et al. | 359/109 |
| 6,681,292 B1 | 1/2004 | Creta et al. | 711/119 | 2003/0065836 A1 | 4/2003 | Pecone | 710/62 |
| 6,697,926 B1 | 2/2004 | Johnson et al. | 711/167 | 2003/0093630 A1 | 5/2003 | Richard et al. | 711/154 |
| 6,715,018 B1 | 3/2004 | Farnworth et al. | 710/300 | 2003/0095559 A1 | 5/2003 | Sano et al. | 370/419 |
| 6,718,440 B1 | 4/2004 | Maiyuran et al. | 711/137 | 2003/0149809 A1 | 8/2003 | Jensen et al. | 710/22 |
| 6,721,195 B1 | 4/2004 | Brunelle et al. | 365/63 | 2003/0156581 A1 | 8/2003 | Osborne | 370/389 |
| 6,724,685 B1 | 4/2004 | Braun et al. | 365/233 | 2003/0163649 A1 | 8/2003 | Kapur et al. | 711/146 |
| 6,728,800 B1 | 4/2004 | Lee et al. | 710/54 | 2003/0193927 A1 | 10/2003 | Hronik | 370/351 |
| 6,735,679 B1 | 5/2004 | Herbst et al. | 711/167 | 2003/0217223 A1 | 11/2003 | Nino, Jr. et al. | 711/105 |
| 6,735,682 B1 | 5/2004 | Segelken et al. | 711/220 | 2003/0227798 A1 | 12/2003 | Pax | 365/189.12 |
| 6,745,275 B1 | 6/2004 | Chang | 710/305 | 2003/0229762 A1 | 12/2003 | Maiyuran et al. | 711/137 |
| 6,751,113 B1 | 6/2004 | Bhakta et al. | 365/63 | 2003/0229770 A1 | 12/2003 | Jeddeloh | 711/213 |
| 6,751,703 B1 | 6/2004 | Chilton | | 2004/0022094 A1 | 2/2004 | Radhakrishnan et al. | 365/200 |
| 6,751,722 B1 | 6/2004 | Mirsky et al. | 712/15 | 2004/0044833 A1 | 3/2004 | Ryan | 711/5 |
| 6,754,117 B1 | 6/2004 | Jeddeloh | 711/213 | 2004/0064602 A1 | 4/2004 | George | 710/22 |
| 6,754,812 B1 | 6/2004 | Abdallah et al. | 712/234 | 2004/0126115 A1 | 7/2004 | Levy et al. | 398/116 |
| 6,756,661 B1 | 6/2004 | Tsuneda et al. | 257/673 | 2004/0128449 A1 | 7/2004 | Osborne et al. | 711/137 |
| 6,760,833 B1 | 7/2004 | Dowling | 712/34 | 2004/0144994 A1 | 7/2004 | Lee et al. | 257/200 |
| 6,771,538 B1 | 8/2004 | Shukuri et al. | 365/185.05 | 2004/0236885 A1 | 11/2004 | Fredriksson | 710/100 |
| 6,775,747 B1 | 8/2004 | Venkatraman | 711/137 | 2005/0015426 A1 | 1/2005 | Woodruff et al. | 709/200 |
| 6,782,435 B1 | 8/2004 | Garcia et al. | 710/33 | 2005/0071542 A1 | 3/2005 | Weber et al. | 711/105 |
| 6,785,780 B1 | 8/2004 | Klein et al. | 711/148 | 2005/0149603 A1 | 7/2005 | DeSota et al. | 709/200 |
| 6,789,173 B1 | 9/2004 | Tanaka et al. | 711/147 | 2005/0166006 A1 | 7/2005 | Talbot et al. | 711/105 |
| 6,792,059 B1 | 9/2004 | Yuan et al. | 375/354 | | | | |
| 6,792,496 B1 | 9/2004 | Aboulenein et al. | 710/306 | | | | |

\* cited by examiner

MEMORY HUB BYPASS CIRCUIT AND METHOD

TECHNICAL FIELD

This invention relates to a computer system, and, more particularly, to a computer system having a memory hub coupling several memory devices to a processor or other memory access device.

BACKGROUND OF THE INVENTION

Computer systems use memory devices, such as dynamic random access memory ("DRAM") devices, to store instructions and data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data is transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate, the delay in initially providing the data can significantly slow the operating speed of a computer system using such SDRAM devices.

One approach to alleviating the memory latency problem is to use multiple memory devices coupled to the processor through a memory hub. In a memory hub architecture, a system controller or memory controller is coupled to several memory modules, each of which includes a memory hub coupled to several memory devices. The memory hub efficiently routes memory requests and responses between the controller and the memory devices. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor.

Although computer systems using memory hubs may provide superior performance, they nevertheless often fail to operate at optimum speed for several reasons. For example, even though memory hubs can provide computer systems with a greater memory bandwidth, they still suffer from latency problems of the type described above. More specifically, although the processor may communicate with one memory device while another memory device is preparing to transfer data, it is sometimes necessary to receive data from one memory device before the data from another memory device can be used. In the event data must be received from one memory device before data received from another memory device can be used, the latency problem continues to slow the operating speed of such computer systems. In addition, the memory hub is designed to handle multiple memory requests. Thus, it is only when the memory hub is busy servicing more than one memory request that the benefits of communicating with multiple memory requests are actually realized. Thus, when the memory hub is not busy, the slower and more complex logic used by the memory hub to handle multiple memory requests creates additional latency when servicing only one memory request.

There is therefore a need for a memory hub that bypasses the normal logic used to handle multiple memory requests when only one memory request is being serviced.

SUMMARY OF THE INVENTION

The present invention is directed to a computer system and method of accessing a plurality of memory devices with a memory hub. The computer system includes a plurality of memory modules coupled to a memory hub controller. Each of the memory modules includes the plurality of memory devices and the memory hub. The memory hub includes a link interface, a sequencer, a bypass circuit, and a memory device interface. The link interface receives memory requests from the memory hub controller and forwards the memory requests to either the sequencer or both the sequencer and the bypass circuit based on the status of the memory device interface. The memory device interface couples memory requests to the memory devices. When the memory device interface is busy servicing one or more memory requests, the sequencer generates memory requests and couples the memory requests to the memory device interface. When the memory device interface is not busy servicing one or more memory requests, the bypass circuit generates memory requests and couples a portion of each of the memory requests to the memory device interface. The sequencer generates and couples the remaining portion of each of the memory requests to the memory device interface. The bypass circuit allows the memory requests to more quickly access the memory devices when the memory device interface is not busy, thereby avoiding the additional latency that would otherwise be created by the sequencer.

As will be apparent, the invention is capable of modifications in various obvious aspects, all without departing from the spirit and scope of the present invention. Accordingly, the drawings and detailed description are to be regarded as illustrative in nature and not restrictive.

DETAILED DESCRIPTION OF THE INVENTION

Figure 1:
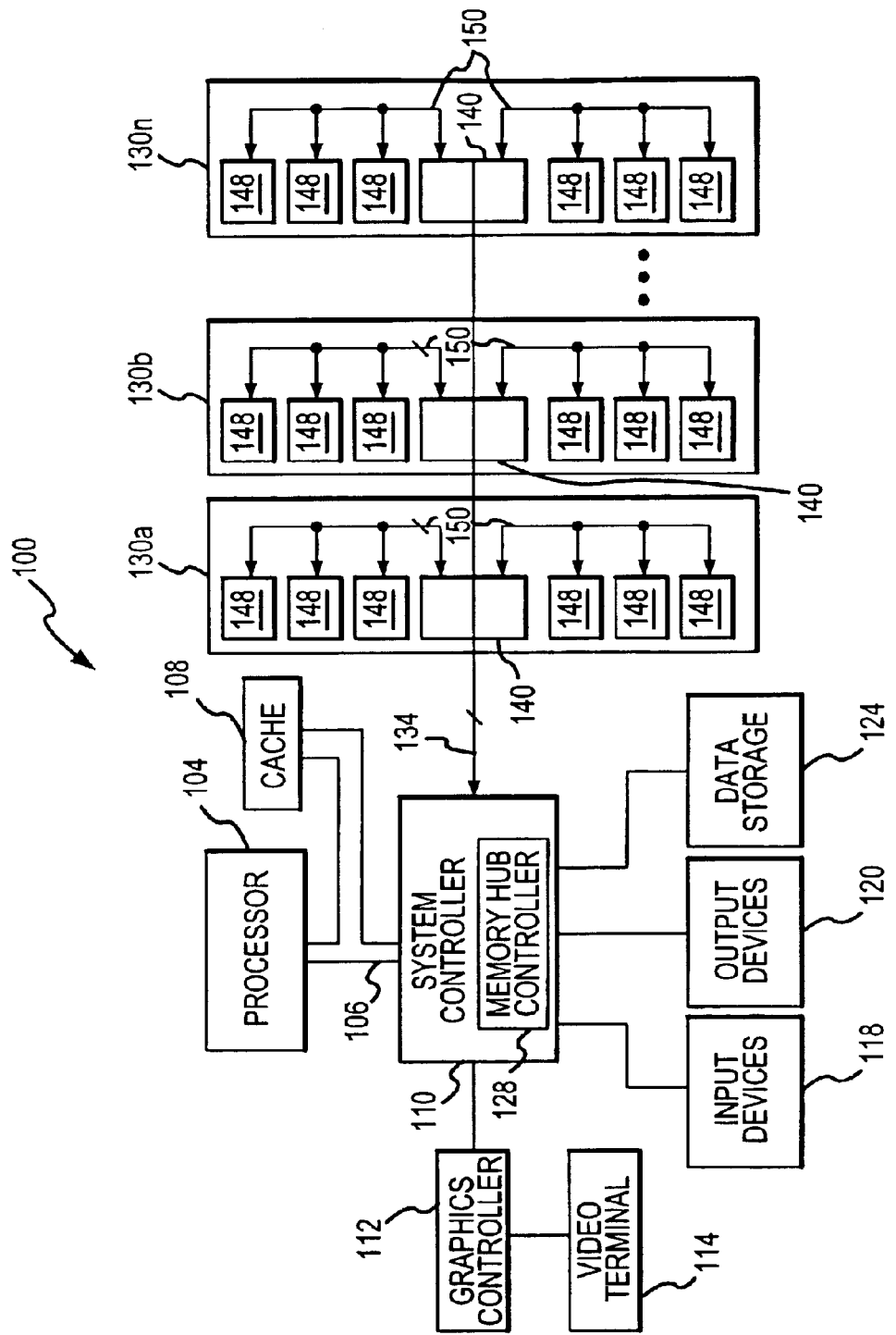
FIG. 1 is a block diagram of a computer system according to one example of the invention in which a memory hub is included in each of a plurality of memory modules.

A computer system 100 according to one example of the invention is shown in FIG. 1. The computer system 100 includes a processor 104 for performing various computing functions, such as executing specific software to perform specific calculations or tasks. The processor 104 includes a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to a system controller 110, which is also sometimes referred to as a "North Bridge" or "memory controller."

The system controller 110 serves as a communications path to the processor 104 for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 includes a memory hub controller 128 that is coupled to several memory modules 130a, 130b, . . . 130n, which serve as system memory for the computer system 100. The memory modules 130 are preferably coupled to the memory hub controller 128 through a high-speed link 134, which may be an optical or electrical communication path or some other type of communications path. In the event the high-speed link 134 is implemented as an optical communication path, the optical communication path may be in the form of one or more optical fibers, for example. In such case, the memory hub controller 128 and the memory modules will include an optical input/output port or separate input and output ports coupled to the optical communication path.

The memory modules 130 are shown coupled to the memory hub controller 128 in a multi-drop arrangement in which the single high-speed link 134 is coupled to all of the memory modules 130. However, it will be understood that other topologies may also be used, such as a point-to-point coupling arrangement in which a separate high-speed link (not shown) is used to couple each of the memory modules 130 to the memory hub controller 128. A switching topology may also be used in which the memory hub controller 128 is selectively coupled to each of the memory modules 130 through a switch (not shown). Other topologies that may be used will be apparent to one skilled in the art.

Each of the memory modules 130 includes a memory hub 140 for controlling access to 6 memory devices 148, which, in the example illustrated in FIG. 1, are synchronous dynamic random access memory ("SDRAM") devices. However, a fewer or greater number of memory devices 148 may be used, and memory devices other than SDRAM devices may, of course, also be used. The memory hub 140 is coupled to each of the system memory devices 148 through a bus system 150, which normally includes a control bus, an address bus and a data bus.

Figure 2:
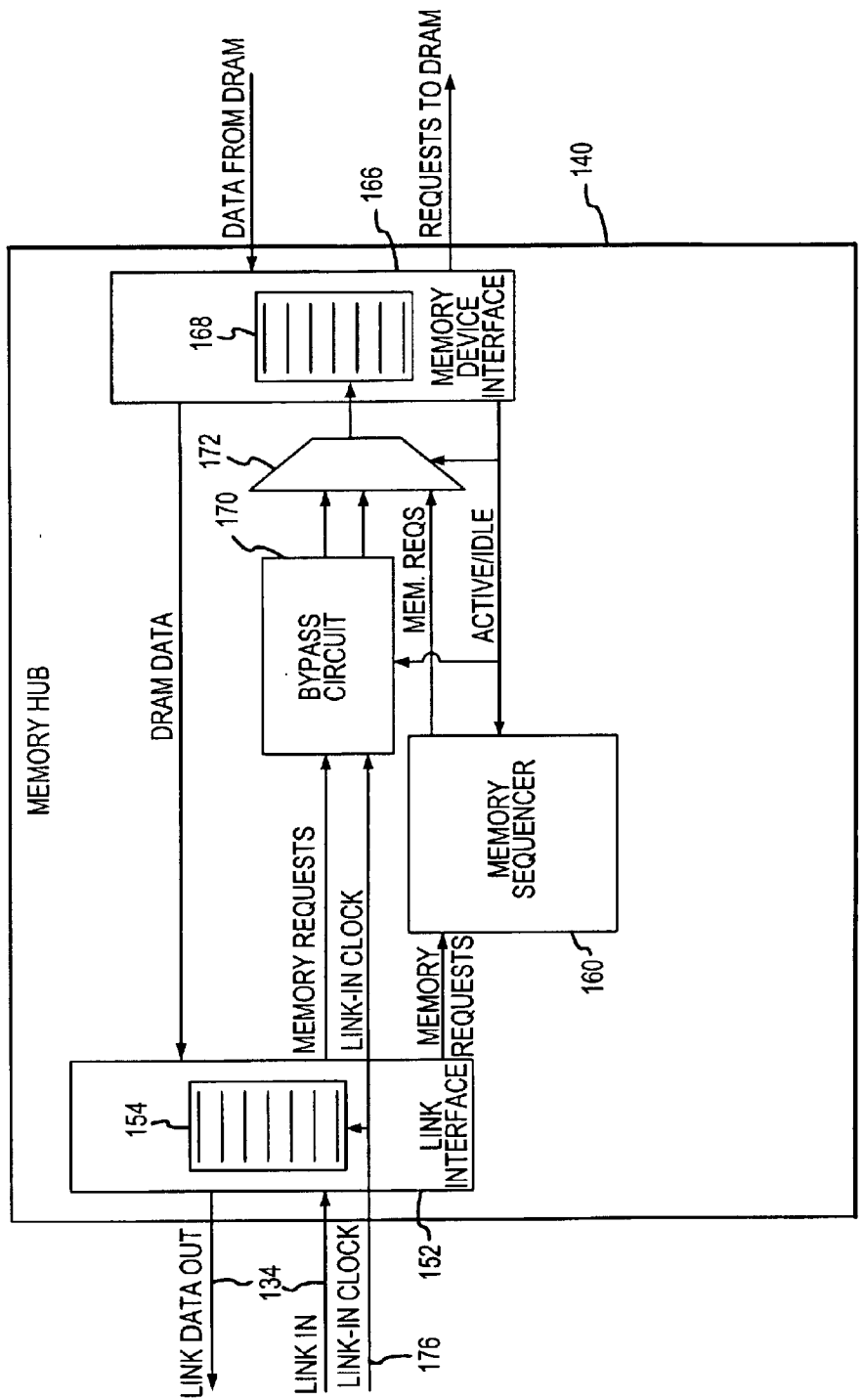
FIG. 2 is a block diagram of a memory hub used in the computer system of FIG. 1.

One example of the memory hub 140 of FIG. 1 is shown in FIG. 2. The memory hub 140 includes a link interface 152 that is coupled to the high-speed link 134. The nature of the link interface 152 will depend upon the characteristics of the high-speed link 134. For example, in the event the high-speed link 134 is implemented using an optical communications path, the link interface 152 will include an optical input/output port and will convert optical signals coupled through the optical communications path into electrical signals. In any case, the link interface 152 preferably includes a buffer, such as a first-in, first-out buffer 154, for receiving and storing memory requests as they are received through the high-speed link 134. The memory requests are stored in the buffer 154 until they can be processed by the memory hub 140.

When the memory hub 140 is able to process a memory request, one of the memory requests stored in the buffer 154 is transferred to a memory sequencer 160. The memory sequencer 160 converts the memory requests from the format output by the memory hub controller 128 into a memory request having a format that can be used by the memory devices 148. These re-formatted request signals will normally include memory command signals, which are derived from memory commands contained in the memory requests received by the memory hub 140, and row and column address signals, which are derived from an address contained in the memory requests received by the memory hub 140. In the event one of the memory requests is a write memory request, the re-formatted request signals will normally include write data signals which are derived from write data contained in the memory request received by the memory hub 140. For example, where the memory devices 148 are conventional DRAM devices, the memory sequencer 160 will output row-address signals, a row address strobe ("RAS") signal, an active high write/active low read signal ("W/R*"), column address signals and a column address strobe ("CAS") signal. The re-formatted memory requests are preferably output from the sequencer 160 in the order they will be used by the memory devices 148. However, the sequencer 160 may output the memory requests in a manner that causes one type of request, such as read requests, to be processed before other types of requests, such as write requests.

The sequencer 160 provides a relatively high bandwidth because it allows the memory hub controller 128 to send multiple memory requests to the memory module 130 containing the memory hub 140, even though previously sent memory requests have not yet been serviced. As a result, the memory requests can be sent at a rate that is faster than the rate at which the memory module 130 can service those requests. The sequencer 160 simply formats the signals of one memory request while memory devices are servicing another memory request. In addition, the sequencer 160 may reorder the memory requests, such as placing a series of read requests before previously received write requests, which reduces the memory read latency.

The memory sequencer 160 applies the re-formatted memory requests to a memory device interface 166. The nature of the memory device interface 166 will again depend upon the characteristics of the memory devices 148. In any case, the memory device interface 166 preferably includes a buffer, such as a FIFO buffer 168, for receiving and storing one or more memory requests as they are received from the link interface 152. The memory requests are stored in the buffer 168 until they can be processed by the memory devices 148.

The memory requests are described above as being received by the memory hub 140 in a format that is different from the format that the memory requests are applied to the memory devices 148. However, the memory hub controller 128 may instead re-format the memory requests from the processor 104 (FIG. 1) to a format that can be used by the memory devices 148. In such case, it is not necessary for the sequencer 160 to re-format the memory requests. Instead, the sequencer 160 simply schedules the re-formatted memory request signals in the order needed for use by the memory devices 148. The memory request signals for one or more memory requests are then transferred to the memory device interface 166 so they can subsequently be applied to the memory devices 148.

As previously explained, the sequencer 160 can provide a memory bandwidth that is significantly higher than the memory bandwidth of conventional computer systems. Although the sequencer 160 provides this advantage when the memory hub controller 128 is issuing memory commands at a rapid rate, the sequencer 160 does not provide this advantage when the memory hub controller 128 is issuing memory requests to a memory module 130 at a rate that can be serviced by the memory module 130. In fact, the sequencer 160 can actually increase the read latency of the memory module 130 when no unserviced memory requests are queued in the memory hub 140. The increased latency results from the need to store the memory requests in the sequencer 160, reformat the memory requests, schedule resulting control signals in the sequencer 160, and begin applying those control signals to the memory devices 148. Also, the memory sequencer 160 has a relatively slow clocking structure that can delay the memory hub 140 from issuing to the memory devices memory requests received from the memory hub controller 128.

The memory hub 140 shown in FIG. 2 avoids the potential disadvantage of using the memory sequencer 160 by including the bypass circuit 170. The bypass circuit 170 allows the memory requests to access the memory devices 148 more quickly when the memory device interface 166 is not busy servicing at least one memory request. As explained above, when multiple memory requests are not being handled by the sequencer 160, the advantages of servicing memory requests with the sequencer 160 no longer exist. Instead, the sequencer 160 increases the memory read latency. The bypass circuit 170, however, allows the memory hub 140 to decrease the access time of each memory request by handling an initial portion of the signal sequencing normally handled by the sequencer 160, and it preferably uses a faster clocking structure than the sequencer 160. Thus, the bypass circuit 170 increases the access time of the memory requests to the memory devices 148.

The bypass circuit 170 includes conventional circuitry that converts each of the memory requests from the format output by the memory hub controller 128 into a memory request with a format that can be used by the memory devices 148. While the bypass circuit 170 may handle reformatting of the entire memory request, the bypass circuit 170 preferably handles the row address portion of the memory request. Similar to the memory sequencer 160 described above, the bypass circuit 170 receives the memory request from the link interface 154. The bypass circuit 170 then reformats the address portion of the memory request into a row address signal. The bypass circuit 170 outputs the row address signal to the memory device interface 166 and then outputs a row address strobe (RAS) to the memory device interface 166. These signals allow the memory device interface 166 to access the addressed row of one of the memory devices 148. By the time the memory devices have processed the portion of the memory request provided by the bypass circuit 170, the sequencer 160 is ready to provide the remaining portion of the memory request.

As shown in FIG. 2, the bypass circuit 170 utilizes a link-in clock 176 from the memory hub controller 128 to forward the row address and RAS signals to the memory device interface 166. The link-in clock 176 is received by the link interface 152 and forwarded to the bypass circuit 170. The bypass circuit includes logic that delays and balances the link-in clock 176 with the clock forwarded from the link interface 152 with the memory requests. More specifically, the link-in clock 176 is used to forward each memory request from the memory hub controller 128 to the memory hub 140, in particular to the link interface 152. The link-in clock 176 is then forwarded to the bypass circuit 170. The memory request output by the link interface 152 to the bypass circuit 170 uses a controller clock, which is a slower clock used by the memory hub 140 to process memory requests. The bypass circuit 170 delays and balances the link-in clock 176 with the controller clock, which allows the bypass circuit 170 to use the link-in clock 176 to service the row portion of the memory request. The faster link-in clock 176 allows the bypass circuit 170 to process and forward the row address and RAS signals more quickly than the controller clock used by the sequencer 160.

While the bypass circuit 170 handles the row portion of the memory request from the link interface 152, the remaining portion of the memory request, for example the command signal and column address, is formatted and forwarded by the sequencer 160. This allows the sequencer 160 to format the remaining portion of the memory request, as explained above, while the read address and RAS signals are accessing the addressed row of one of the memory devices 148. Thus, the sequencer 160 does not have to service the row portion of the memory request. This structure increases the overall access time to the memory devices 148, thus reducing the latency of the memory hub 140, because the bypass circuit 170 forwards the row address and RAS signals to one of the memory devices more quickly than the sequencer 160. In addition, during the clock delays used by the row address and RAS signals to access one of the memory devices 148, the sequencer 160 is formatting and ordering the remaining signals of the memory request. Thus, once the remaining signals are formatted and ordered by the sequencer 160, they can be immediately coupled to the memory device 148 that has already been accessed by the row address signal.

The bypass circuit 170 is utilized by the memory hub 140 when the memory device interface 166 is not busy servicing memory requests. The memory device interface 166 generates a high "ACTIVE/IDLE*" signal when the buffer 168 of the memory device interface 166 is active and contains, for example, one or more memory requests. The high ACTIVE/IDLE* signal indicates that the memory device interface is busy, thus memory requests can be more efficiently handled by using the sequencer 160. When the buffer 168 contains, for example, less than one memory request, the memory device interface generates a low "ACTIVE/IDLE*" signal. The low ACTIVE/IDLE* signal indicates that the memory device interface is not busy, thus the memory hub 140 uses the bypass circuit 170 and sequencer 160 to service memory requests. The ACTIVE and IDLE* conditions generated by the memory device interface 166 are not limited to the circumstances described above. For example, the memory device interface 166 may generate an ACTIVE signal based on the buffer 168 containing a certain percentage of memory requests and likewise an IDLE* signal when the number of memory requests is under a certain percentage.

The memory hub 140, shown in FIG. 2, further includes a multiplexer 172, which works in conjunction with the memory device interface 166 to service the memory requests. The multiplexer 172 has inputs coupled to the bypass circuit 170 and the sequencer 160, an output coupled to the memory device interface 166, and a control input coupled to the memory device interface 166. The multiplexer 172 uses the ACTIVE/IDLE* signal from the memory device interface 166 to couple memory requests to the memory device interface 166. When the multiplexer 172 receives an ACTIVE signal, or a high ACTIVE/IDLE* signal, the multiplexer 172 couples memory requests from the sequencer 160 to the memory device interface 166. Likewise, when the multiplexer 172 receives an IDLE* signal, or a low ACTIVE/IDLE* signal, the multiplexer 172 couples a portion of each memory request from the bypass circuit 170 to the memory device interface 166 and a portion of each memory request from the sequencer 160 to the memory device interface 166.

The ACTIVE/IDLE* signal generated by the memory device interface 166 is also used to determine whether memory requests should be forwarded from the link interface 152 to the sequencer 160 or to both the bypass circuit 170 and the sequencer 160. Both the sequencer 160 and the bypass circuit 170 are coupled to the memory device interface 166. When the memory device interface 166 generates an ACTIVE signal, the sequencer 160 receives the memory requests from the link interface 152 and generates and couples memory requests to the multiplexer 172. When the memory device interface 166 generates an IDLE* signal, both the sequencer 160 and the bypass circuits receive the memory requests and handle specific portions of each of the memory requests, as described above.

Although the present invention has been described with reference to preferred embodiments, persons skilled in the art will recognize that changes may be made in form and detail without departing from the spirit and scope of the invention. Accordingly, the invention is not limited except as by the appended claims.

What is claimed is:

1. A memory module, comprising:
    a plurality of memory devices; and
    a memory hub, comprising:
    a link interface receiving memory requests for access to at least one of the memory devices;
    a memory device interface coupled to the plurality of memory devices, the memory device interface coupling memory requests to the memory devices and generating a status signal indicating whether or not at least one of the memory requests is being serviced;
    a bypass circuit coupled to the link interface and the memory device interface, the bypass circuit generating and coupling a portion of each of the memory requests from the link interface to the memory device interface responsive to the status signal from the memory device interface indicating that at least one of the memory requests is not being serviced; and
    a sequencer coupled to the link interface and the memory device interface, the sequencer generating and coupling memory requests from the link interface to the memory device interface responsive to the status signal from the memory device interface indicating that at least one of the memory requests is being serviced and generating and coupling the remaining portion of each of the memory requests not handled by the bypass circuit from the link interface to the memory device interface responsive to the status signal from the memory device interface indicating that at least one of the memory requests is not being serviced.

2. The memory module of claim 1 wherein the status signal comprises:
    an active signal indicating that at least one of the memory requests is being serviced; and
    an idle signal indicating that at least one of the memory requests is not being serviced.

3. The memory module of claim 1 wherein the memory hub further comprises a multiplexer having data inputs coupled to the sequencer and the bypass circuit, a data output coupled to the memory device interface and a control input coupled to receive the status signal from the memory device interface, the multiplexer coupling the memory requests from the sequencer responsive to the status signal indicating that at least one of the memory requests is being serviced and coupling a portion of the memory request from the bypass circuit and a portion from the sequencer responsive to the status signal indicating that at least one of the memory requests is not being serviced.

4. The memory module of claim 3 wherein the link interface further receives a link-in clock with each of the memory requests, the link-in clock being forwarded to the bypass circuit along with the memory requests and used by the bypass circuit to generate and couple memory requests to the multiplexer responsive to the status signal indicating that at least one of the memory requests is not being serviced.

5. The memory module of claim 1 wherein the link interface further receives a link-in clock with each of the memory requests, the link-in clock being forwarded to the bypass circuit along with the memory requests and used by the bypass circuit to generate and couple memory requests to the memory device interface responsive to the status signal from the memory device interface indicating that at least one of the memory requests is not being serviced.

6. The memory module of claim 1 wherein the memory device interface comprises a first-in, first-out buffer that is operable to receive and store memory requests received from the link interface and to transfer the stored memory requests to at least one of the memory devices in the order in which they were received.

7. The memory module of claim 6 wherein the link interface comprises a first-in, first-out buffer that is operable to receive and store memory requests and to transfer the stored memory requests to the memory device interface in the order in which they were received.

8. The memory module of claim 1 wherein the link interface comprises a first-in, first-out buffer that is operable to receive and store memory requests and to transfer the stored memory requests to the memory device interface in the order in which they were received.

9. The memory module of claim 1 wherein the memory device interface is coupled to the link interface, the memory device interface further receiving read data responsive to the memory requests and coupling the read data to the link interface.

10. The memory module of claim 1 wherein the link interface comprises an optical input/output port.

11. The memory module of claim 1 wherein the memory devices comprises dynamic random access memory devices.

12. The memory module of claim 1 wherein the portion of each of the memory requests generated and coupled by the bypass circuit includes the row address portion of each of the memory requests.

13. A memory hub, comprising:
    a link interface receiving memory requests;
    a memory device interface operable to output memory requests, the memory device interface generating a status signal indicating whether or not at least one of the memory requests is being serviced;

a bypass circuit coupled to the link interface and the memory device interface, the bypass circuit generating and coupling a portion of each of the memory requests from the link interface to the memory device interface responsive to the status signal from the memory device interface indicating that at least one of the memory requests is not being serviced; and a sequencer coupled to the link interface and the memory device interface, the sequencer generating and coupling the memory requests from the link interface to the memory device interface responsive to the status signal from the memory device interface indicating that at least one of the memory requests is being serviced and generating and coupling the remaining portion of each of the memory requests not handled by the bypass circuit from the link interface to the memory device interface responsive to the status signal from the memory device interface indicating that at least one of the memory requests is not being serviced.

14. The memory hub of claim 13 wherein the status signal comprises:

an active signal indicating that at least one of the memory requests is being serviced; and an idle signal indicating that at least one of the memory requests is not being serviced.

15. The memory hub of claim 13 wherein the memory hub further comprises a multiplexer having data inputs coupled to the sequencer and the bypass circuit, a data output coupled to the memory device interface and a control input coupled to receive the status signal from the memory device interface, the multiplexer coupling the memory requests from the sequencer responsive to the status signal indicating that at least one of the memory requests is being serviced and coupling a portion of the memory request from the bypass circuit and a portion from the sequencer responsive to the status signal indicating that at least one of the memory requests is not being serviced.

16. The memory hub of claim 15 wherein the link interface further receives a link-in clock with each of the memory requests, the link-in clock being forwarded to the bypass circuit along with the memory requests and used by the bypass circuit to generate and couple memory requests to the multiplexer responsive to the status signal indicating that at least one of the memory requests is not being serviced.

17. The memory hub of claim 13 wherein the link interface further receives a link-in clock with each of the memory requests, the link-in clock being forwarded to the bypass circuit along with the memory requests and used by the bypass circuit to generate and couple memory requests to the memory device interface responsive to the status signal from the memory device interface indicating that at least one of the memory requests is not being serviced.

18. The memory hub of claim 13 wherein the memory device interface comprises a first-in, first-out buffer that is operable to receive and store memory requests received from the link interface and to transfer the stored memory requests to at least one of the memory devices in the order in which they were received.

19. The memory hub of claim 18 wherein the link interface comprises a first-in, first-out buffer that is operable to receive and store memory requests and to transfer the stored memory requests to the memory device interface in the order in which they were received.

20. The memory hub of claim 13 wherein the link interface comprises a first-in, first-out buffer that is operable to receive and store memory requests and to transfer the stored memory requests to the memory device interface in the order in which they were received.

21. The memory hub of claim 13 wherein the memory device interface is coupled to the link interface, the memory device interface further receiving read data responsive to the memory requests and coupling the read data to the link interface.

22. The memory hub of claim 13 wherein the link interface comprises an optical input/output port.

23. The memory hub of claim 13 wherein the memory devices comprises dynamic random access memory devices.

24. The memory hub of claim 13 wherein the portion of each of the memory requests generated and coupled by the bypass circuit includes the row address portion of each of the memory requests.

25. A computer system, comprising:

a central processing unit ("CPU");

a system controller coupled to the CPU, the system controller having an input port and an output port;

an input device coupled to the CPU through the system controller;

an output device coupled to the CPU through the system controller;

a storage device coupled to the CPU through the system controller; and a plurality of memory modules, each of the memory modules comprising:

a plurality of memory devices; and a memory hub, comprising:

a link interface receiving memory requests for access to at least one of the memory devices;

a memory device interface coupled to the memory devices, the memory device interface coupling memory requests to the memory devices and generating a status signal indicating whether or not at least one of the memory requests is being serviced;

a bypass circuit coupled to the link interface and the memory device interface, the bypass circuit generating and coupling a portion of each of the memory requests from the link interface to the memory device interface responsive to the status signal from the memory device interface indicating that at least one of the memory requests is not being serviced; and a sequencer coupled to the link interface and the memory device interface, the sequencer generating and coupling memory requests from the link interface to the memory device interface responsive to the status signal from the memory device interface indicating that at least one of the memory requests is being serviced and generating and coupling the remaining portion of each of the memory requests not handled by the bypass circuit from the link interface to the memory device interface responsive to the status signal from the memory device interface indicating that at least one of the memory requests is not being serviced; and a communications link coupling the output port of the system controller to the input port of the memory hub in each of the memory modules, and coupling the input port of the system controller to the output port of the memory hub in each of the memory modules.

26. The computer system of claim 25 wherein the status signal comprises:

an active signal indicating that at least one of the memory requests is being serviced; and an idle signal indicating that at least one of the memory requests is not being serviced.

27. The computer system of claim 26 wherein the memory hub further comprises a multiplexer having data inputs coupled to the sequencer and the bypass circuit, a data output coupled to the memory device interface and a control input coupled to receive the status signal from the memory device interface, the multiplexer coupling the memory requests from the sequencer responsive to the status signal indicating that at least one of the memory requests is being serviced and coupling a portion of the memory request from the bypass circuit and a portion from the sequencer responsive to the status signal indicating that at least one of the memory requests is not being serviced.

28. The computer system of claim 27 wherein the link interface further receives a link-in clock with each of the memory requests, the link-in clock being forwarded to the bypass circuit along with the memory requests and used by the bypass circuit to generate and couple memory requests to the multiplexer responsive to the status signal indicating that at least one of the memory requests is not being serviced.

29. The computer system of claim 26 wherein the link interface further receives a link-in clock with each of the memory requests, the link-in clock being forwarded to the bypass circuit along with the memory requests and used by the bypass circuit to generate and couple memory requests to the memory device interface responsive to the status signal from the memory device interface indicating that at least one of the memory requests is not being serviced.

30. The computer system of claim 26 wherein the memory device interface comprises a first-in, first-out buffer that is operable to receive and store memory requests received from the link interface and to transfer the stored memory requests to at least one of the memory devices in the order in which they were received.

31. The computer system of claim 30 wherein the link interface comprises a first-in, first-out buffer that is operable to receive and store memory requests and to transfer the stored memory requests to the memory device interface in the order in which they were received.

32. The computer system of claim 26 wherein the link interface comprises a first-in, first-out buffer that is operable to receive and store memory requests and to transfer the stored memory requests to the memory device interface in the order in which they were received.

33. The computer system of claim 26 wherein the memory device interface is coupled to the link interface, the memory device interface further receiving read data responsive to the memory requests and coupling the read data to the link interface.

34. The computer system of claim 26 wherein the link interface comprises an optical input/output port.

35. The computer system of claim 34 wherein the communications link comprises an optical communications link, wherein the input and output ports of the system controller comprises an optical input/output port coupled to the optical communications link and wherein the input and output ports of each of the memory hubs comprises a respective optical input/output port coupled to the optical communications link.

36. The computer system of claim 26 wherein the memory devices comprises dynamic random access memory devices.

37. The computer system of claim 26 wherein the portion of each of the memory requests generated and coupled by the bypass circuit includes the row address portion of each of the memory requests.

38. The computer system of claim 26 wherein the input and output ports of the system controller comprises a combined input/output port coupled to the communications link, and wherein the input and output ports of each of the memory hubs comprises a combined input/output port coupled to the communications link.

39. A method of accessing data in each of a plurality of memory devices on each of a plurality of memory modules, each of the memory modules including a memory hub, the method comprising:

checking if a memory device interface located on the memory hub is servicing memory requests;

if the memory device interface is servicing memory requests, sending memory requests through a sequencer located on the memory hub to the memory device interface; and if the memory device interface is not busy servicing memory requests, sending a portion of each of the memory requests through a bypass circuit located on the memory hub to the memory device interface and the remaining portion of each of the memory requests through the sequencer to the memory device interface.

40. The method of claim 39 wherein the portion of the each of the memory requests sent through the bypass circuit includes the row address portion of each of the memory requests.

* * * * *